United States Patent
Bautista

(10) Patent No.: US 12,018,858 B2
(45) Date of Patent: Jun. 25, 2024

(54) OUTDOOR MISTING ASSEMBLY

(71) Applicant: Rhodelia Bautista, Elgin, IL (US)

(72) Inventor: Rhodelia Bautista, Elgin, IL (US)

( * ) Notice: Subject to any disclaimer, the term of this patent is extended or adjusted under 35 U.S.C. 154(b) by 841 days.

(21) Appl. No.: 17/007,892

(22) Filed: Aug. 31, 2020

(65) Prior Publication Data

US 2022/0065472 A1     Mar. 3, 2022

(51) Int. Cl.
| | |
|---|---|
| *F24F 6/14* | (2006.01) |
| *B05B 17/06* | (2006.01) |
| *F24F 5/00* | (2006.01) |
| *F24F 6/00* | (2006.01) |
| *F24F 11/88* | (2018.01) |
| *F24F 13/20* | (2006.01) |

(52) U.S. Cl.
CPC ............ *F24F 6/14* (2013.01); *B05B 17/0607* (2013.01); *F24F 5/0046* (2013.01); *F24F 11/88* (2018.01); *F24F 13/20* (2013.01); *F24F 2005/0064* (2013.01); *F24F 2006/008* (2013.01); *F24F 2221/26* (2013.01)

(58) Field of Classification Search
CPC .. F24F 6/14; F24F 11/88; F24F 5/0046; F24F 13/20; F24F 2005/0064; F24F 2006/008; F24F 2221/26; B05B 17/0607

USPC .......................................... 239/102.1, 102.2
See application file for complete search history.

(56) References Cited

U.S. PATENT DOCUMENTS

| | | | |
|---|---|---|---|
| 4,350,646 A | 9/1982 | Baus | |
| 4,667,877 A * | 5/1987 | Yao | .................... B05B 17/0615 |
| | | | 239/424.5 |
| D364,676 S | 11/1995 | Chiu | |
| 6,592,053 B2 | 7/2003 | Ericksen | |
| 7,380,406 B2 | 6/2008 | Leblanc | |
| 9,005,523 B2 | 4/2015 | Hill | |
| 2008/0203186 A1 | 8/2008 | Grocke | |
| 2010/0327073 A1 | 12/2010 | Kette | |
| 2014/0123694 A1 | 5/2014 | Huang | |

* cited by examiner

*Primary Examiner* — Christopher S Kim

(57) ABSTRACT

An outdoor misting assembly for producing a cooling mist during hot day includes a housing that has a fluid reservoir therein that can be filled with water. A misting unit is positioned in the fluid reservoir and the misting unit can be submerged in the water. The misting unit vibrates at a pre-determined frequency when the misting unit is turned on to vibrate the water into a mist. A plurality of tubes is each fluidly coupled to the misting unit to receive the mist. Each of the tubes extends outwardly from the housing to direct the mist toward a plurality of users for cooling the users during a hot day.

9 Claims, 7 Drawing Sheets

OUTDOOR MISTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to misting devices and more particularly pertains to a new misting device for producing a cooling mist during a hot day.

(2) Description of Related Art Including Information Disclosed Under 37 CFR 1.97 and 1.98

The prior art relates to misting devices.

BRIEF SUMMARY OF THE INVENTION

An embodiment of the disclosure meets the needs presented above by generally comprising a housing that has a fluid reservoir therein that can be filled with water. A misting unit is positioned in the fluid reservoir and the misting unit can be submerged in the water. The misting unit vibrates at a pre-determined frequency when the misting unit is turned on to vibrate the water into a mist. A plurality of tubes is each fluidly coupled to the misting unit to receive the mist. Each of the tubes extends outwardly from the housing to direct the mist toward a plurality of users for cooling the users during a hot day.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
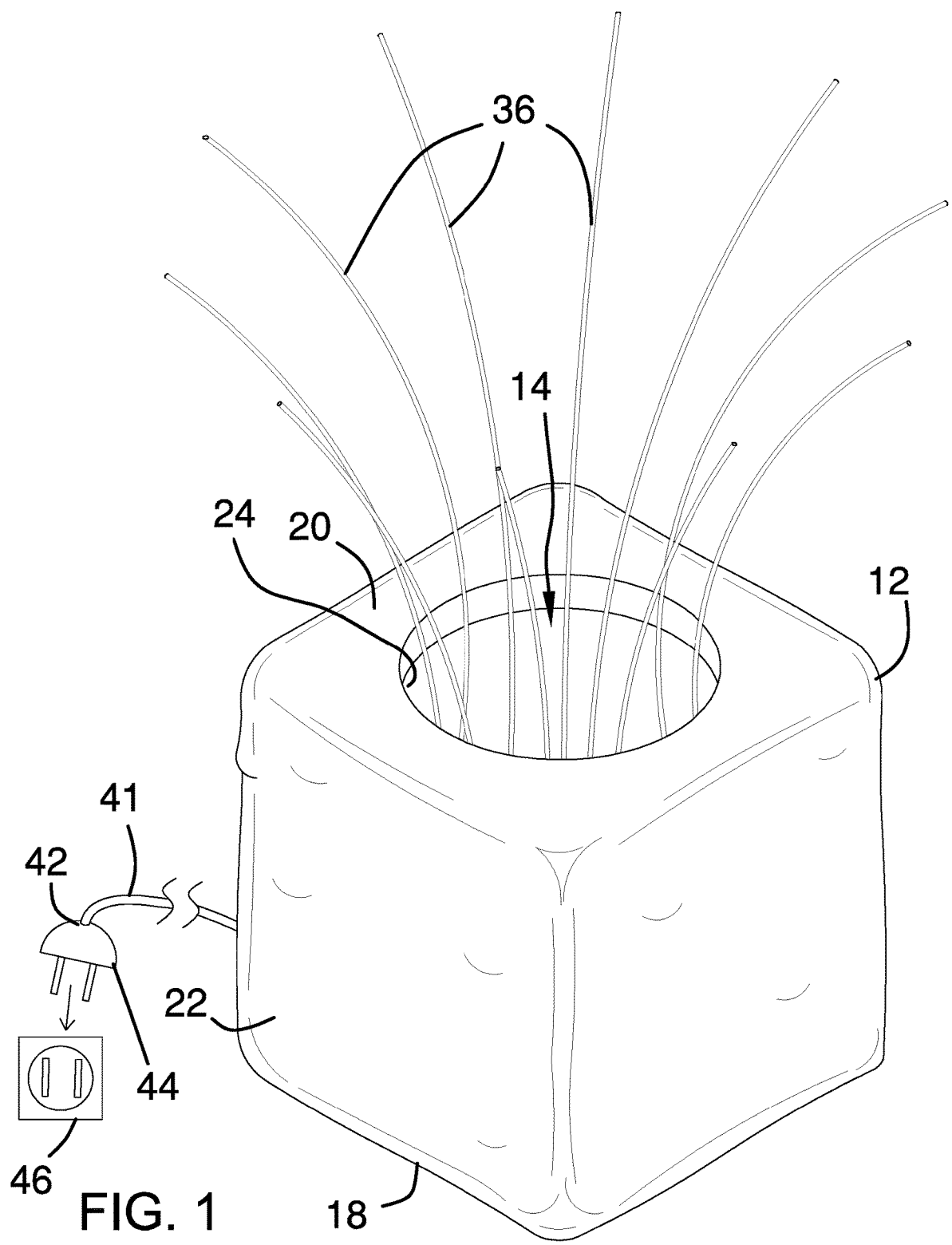
FIG. 1 is a top perspective view of an outdoor misting assembly according to an embodiment of the disclosure.
Figure 2:
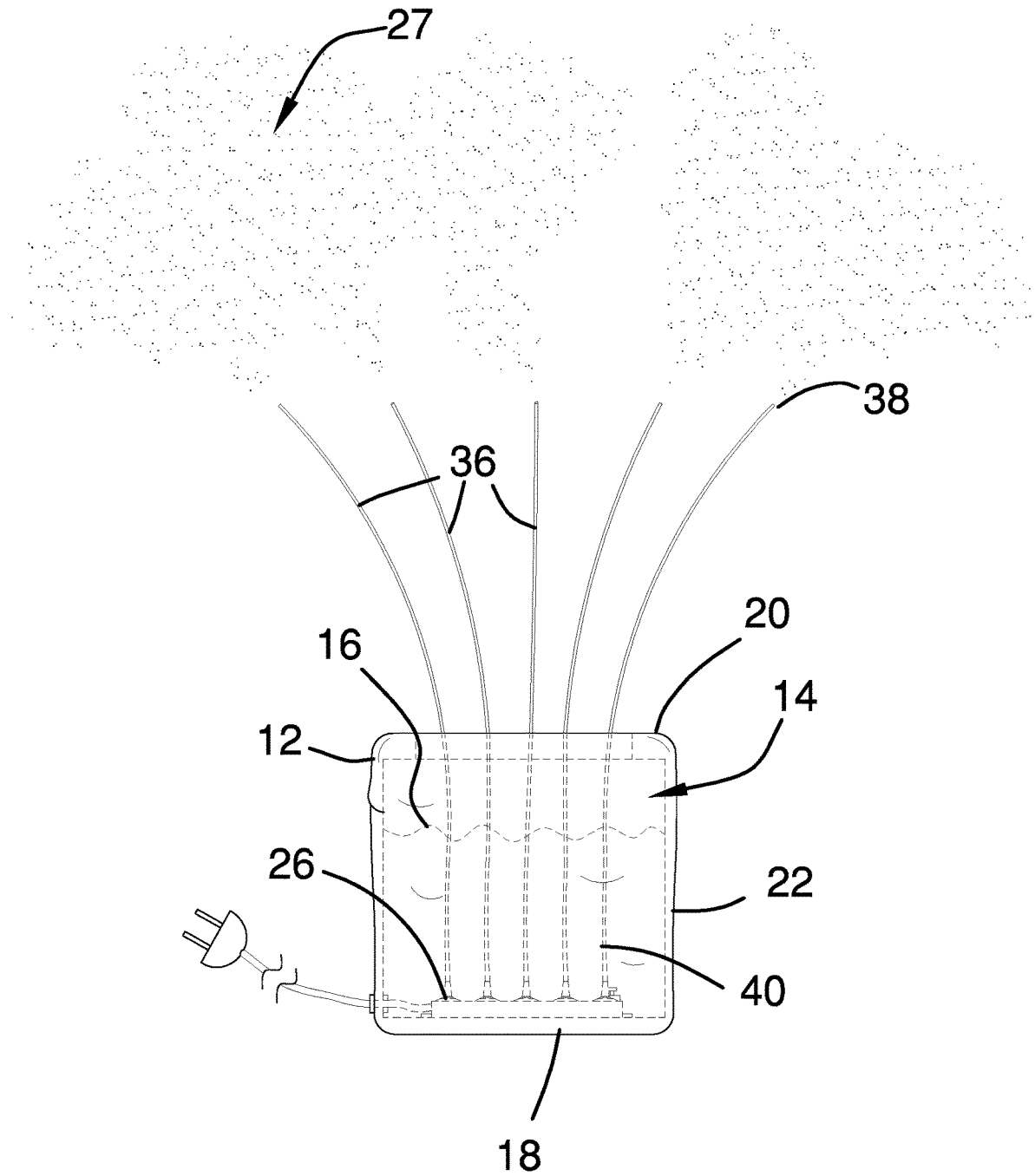
FIG. 2 is a front phantom view of an embodiment of the disclosure.
Figure 3:
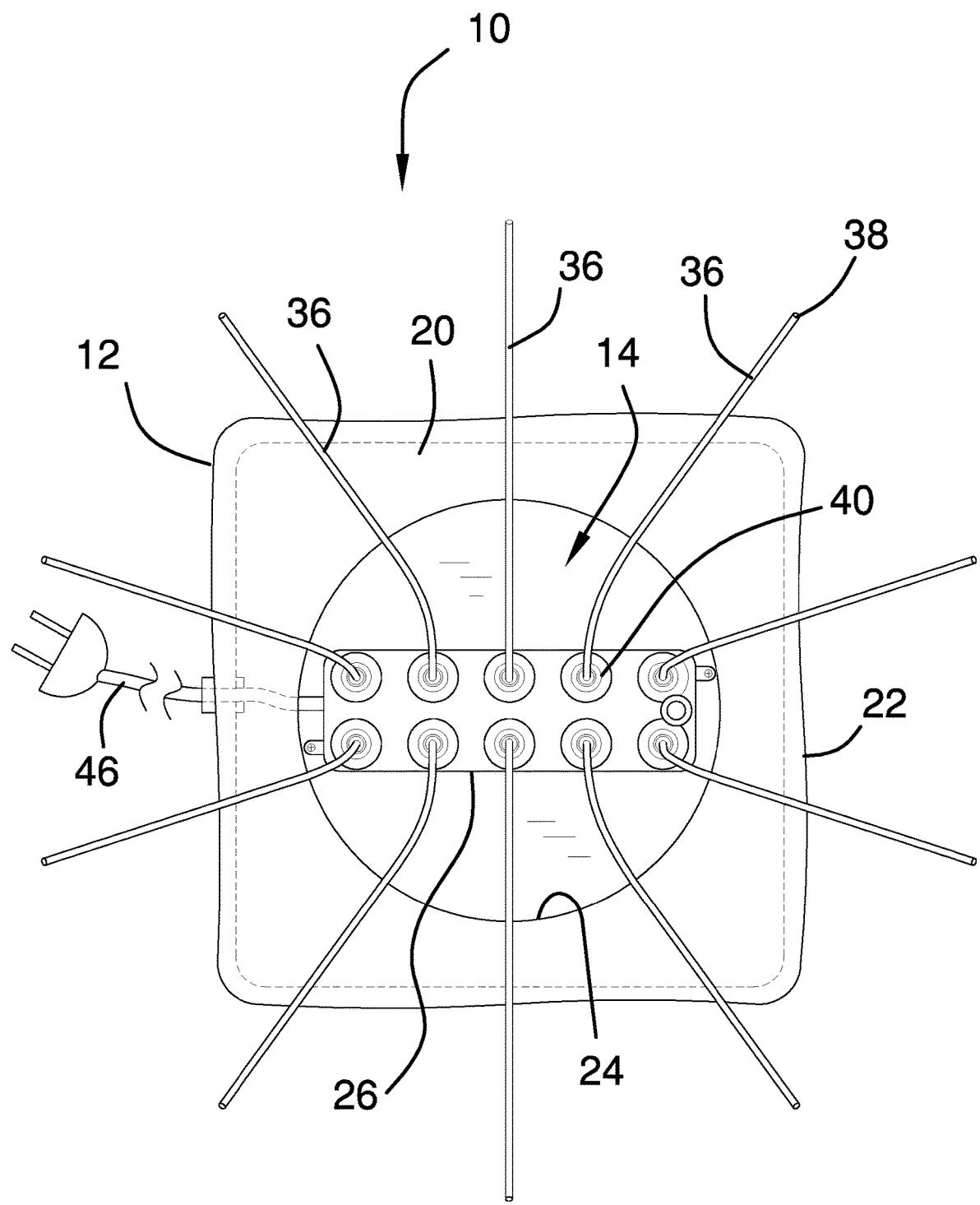
FIG. 3 is a top view of an embodiment of the disclosure.
Figure 4:
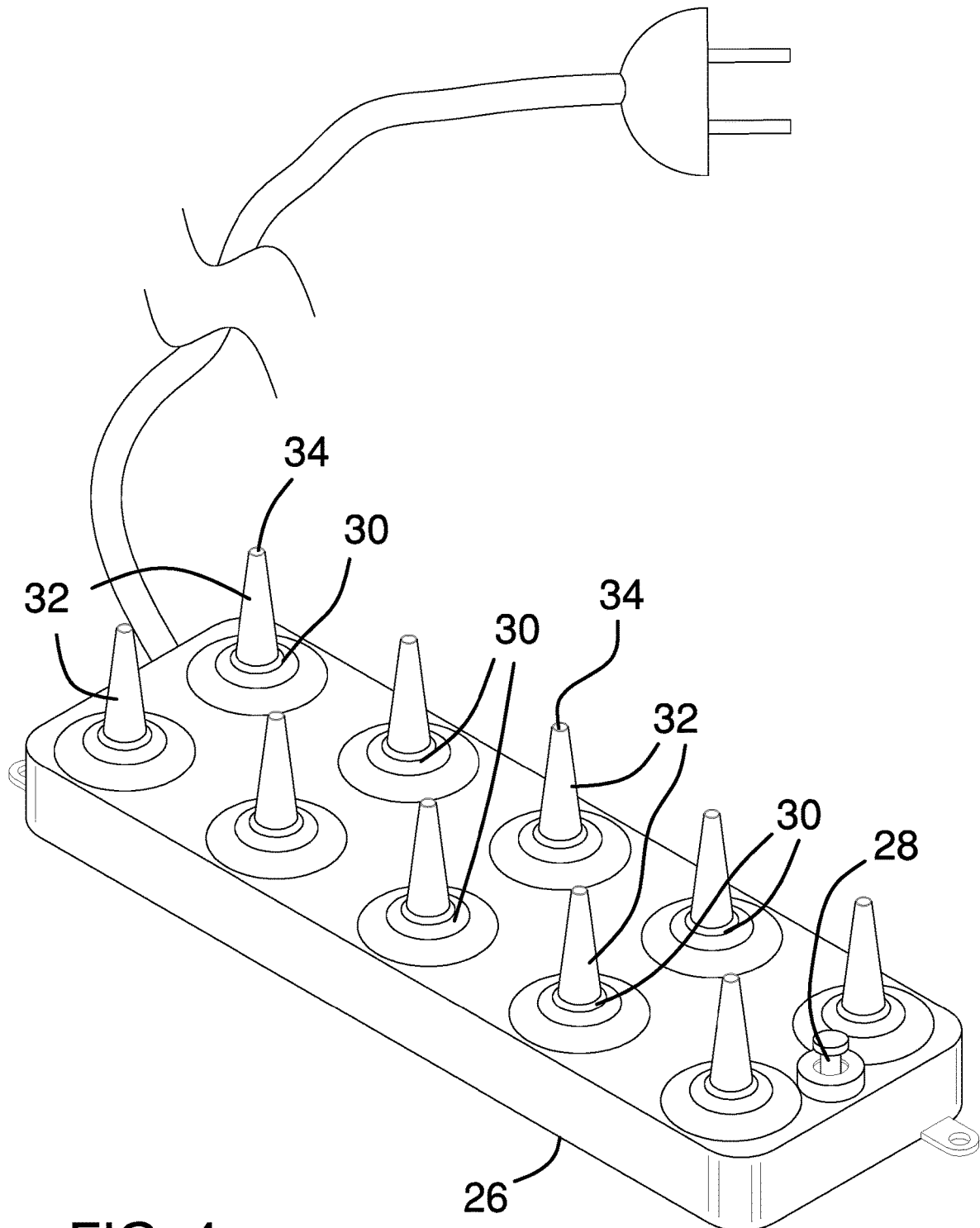
FIG. 4 is a perspective view of a misting unit of an embodiment of the disclosure.

With reference now to the drawings, and in particular to FIGS. 1 through 7 thereof, a new misting device embodying the principles and concepts of an embodiment of the disclosure and generally designated by the reference numeral 10 will be described.

As best illustrated in FIGS. 1 through 7, the outdoor misting assembly 10 generally comprises a housing 12 that has a fluid reservoir 14 therein such that the housing 12 can be filled with water 16. The housing 12 has a bottom wall 18, a top wall 20 and an outer wall 22 extending therebetween, and the top wall 20 has an opening 24 extending into an interior of the housing 12. The outer wall 22 of the housing 12 may have a plurality of intersecting sides such that the housing 12 has a cubic shape representative of an ice-cube.

A misting unit 26 is positioned in the fluid reservoir 14 such that the misting unit 26 is submerged in the water 16. The misting unit 26 vibrates at a pre-determined frequency when the misting unit 26 is turned on to vibrate the water 16 into a mist 27. The misting unit 26 lies on the bottom wall 18 of the housing 12. The misting unit 26 has a fluid intake 28 and a plurality of mist outlets 30, and the misting unit 26 urges the water 16 inwardly through the fluid intake 28. The misting unit 26 urges the mist 27 outwardly through each of the mist outlets 30. Additionally, the misting unit 26 may comprise an ultrasonic misting unit of any conventional design.

A plurality of funnels 32 is each coupled to the misting unit 26. Each of the funnels 32 is in fluid communication with a respective one of the mist outlets 30 to direct the mist 27 outwardly from the misting unit 26. Each of the funnels 32 has a distal end 34 with respect to the misting unit 26 and each of the funnels 32 tapers inwardly between the misting unit 26 and the distal end 34. A plurality of tubes 36 is provided and each of the tubes 36 is fluidly coupled to the misting unit 26 to receive the mist 27. Each of the tubes 36 extends outwardly from the housing 12 to direct the mist 27 toward a plurality of users for cooling the users during a hot day.

Each of the tubes 36 has a first end 38 and a second end 40, and the second end 40 of each of the tubes 36 is fluidly coupled to the distal end 34 of a respective one of the funnels 32. Each of the tubes 36 extends outwardly through the opening 24 in the top wall 20 of the housing 12 having the first end 38 of each of the tubes 36 being exposed. Each of the tubes 36 is comprised of a resiliently deformable material thereby facilitating the first end 38 of each of the tubes 36 to be pointed in a predetermined direction.

A power cord 41 is electrically coupled to the misting unit 26 and the power cord 41 has a distal end 42 with respect to the housing 12. A male plug 44 is electrically coupled to the distal end 42 of the power cord 41. The male plug 44 is insertable into power source 46 comprising a solar panel outlet. In this way the misting unit 26 can be powered in a remote location that does not have electrical service.

Figure 5:
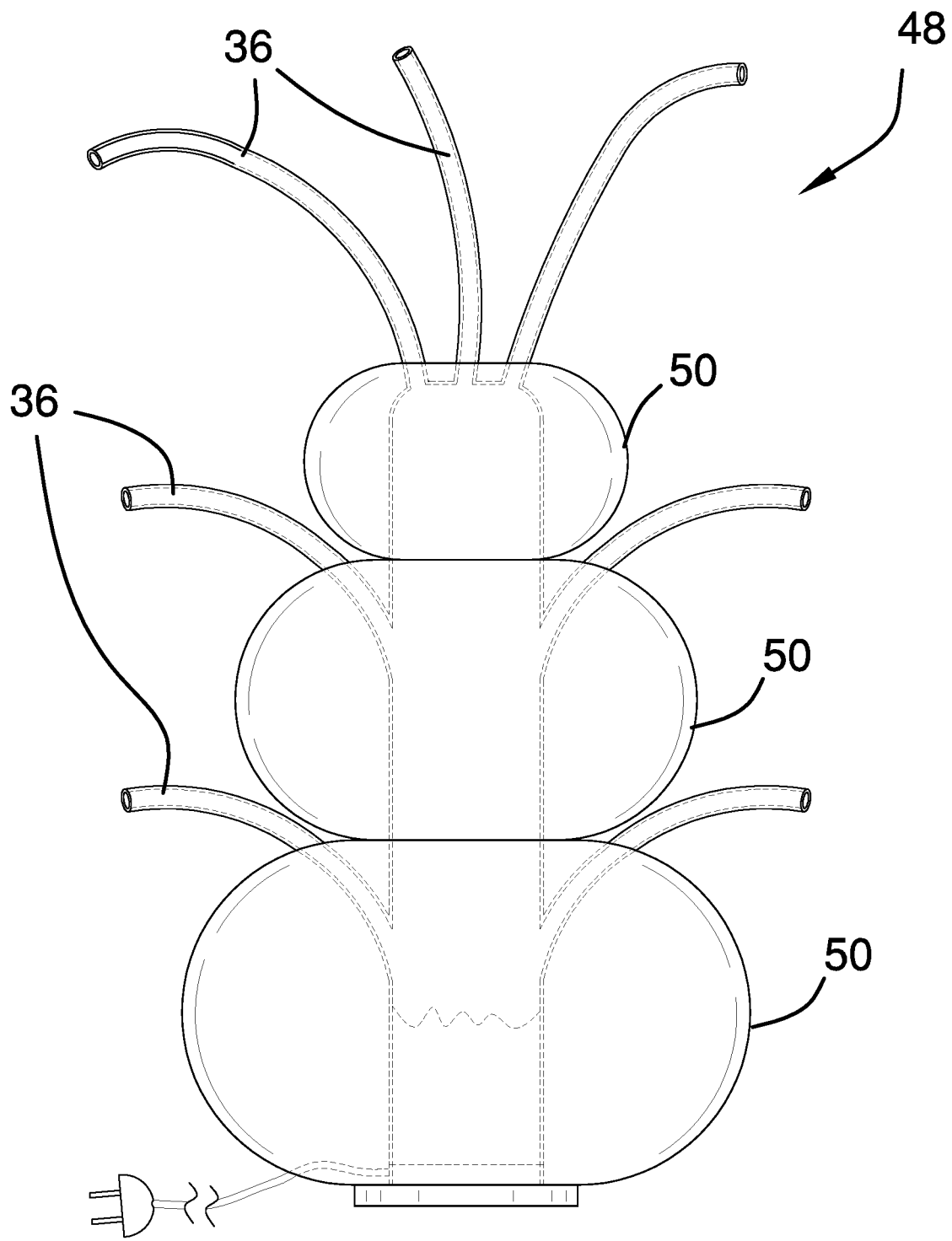
FIG. 5 is a front phantom view of an alternative embodiment of the disclosure.
Figure 6:
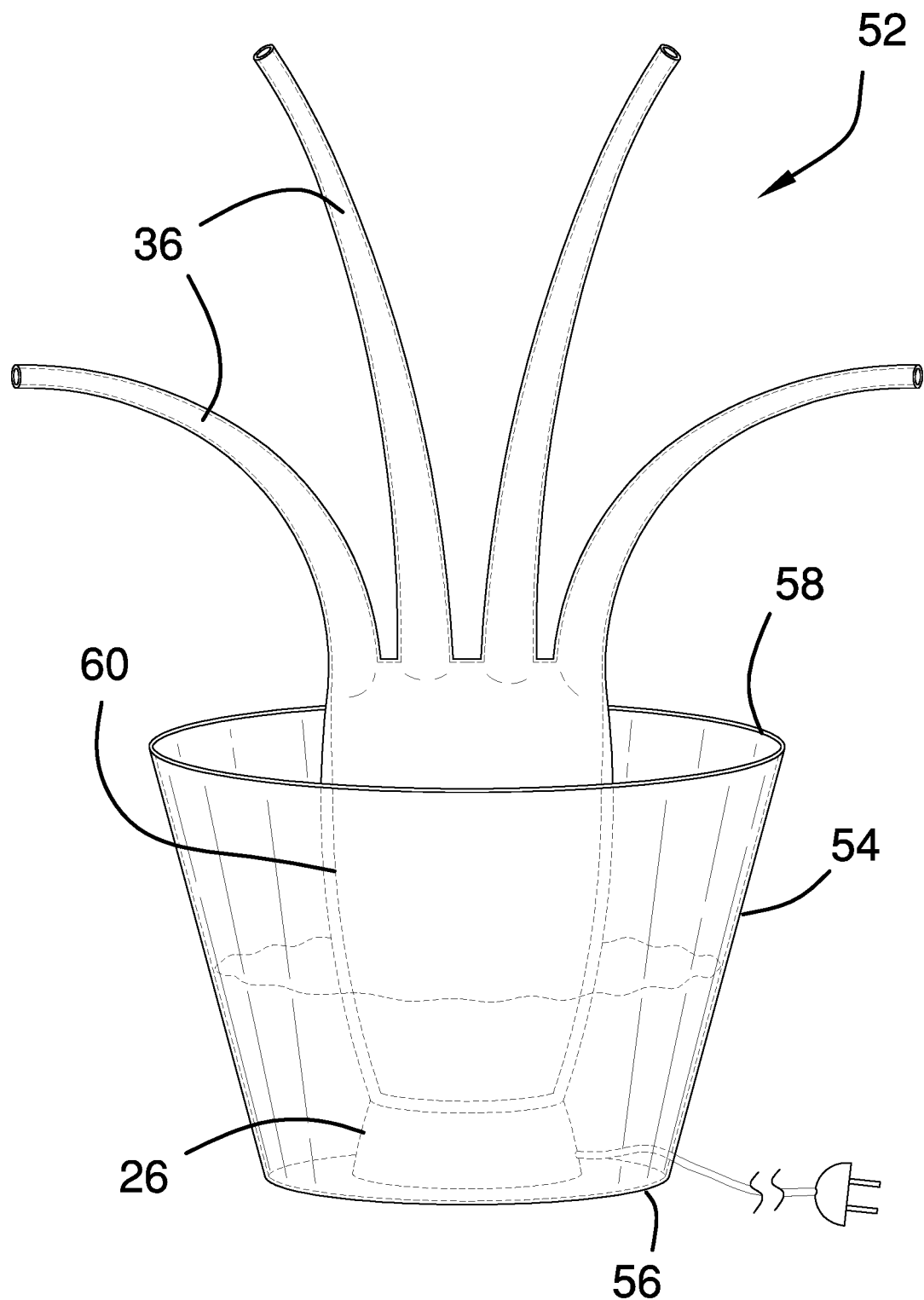
FIG. 6 is a phantom view of an alternative embodiment of the disclosure.

In an alternative embodiment 48 as is most clearly shown in FIG. 5 the housing 12 may comprise a plurality of oblate spheroids 50 that are stacked on top of one another. Each of the tubes 36 extends outwardly through a respective one of the oblate spheroids 50. In an alternative embodiment 52 as is most clearly shown in FIG. 6, a bucket 54 is provided that has a lower end 56 and an upper end 58. The misting unit 26 is positioned within the bucket 54 having the misting unit 26 resting on the lower end 56. A manifold 60 is fluidly coupled to the misting unit 26. Each of the tubes 36 is fluidly coupled to and extends upwardly from the manifold 60 having each of the tubes 36 being directed outwardly from the upper end 58 of the bucket 54.

Figure 7:
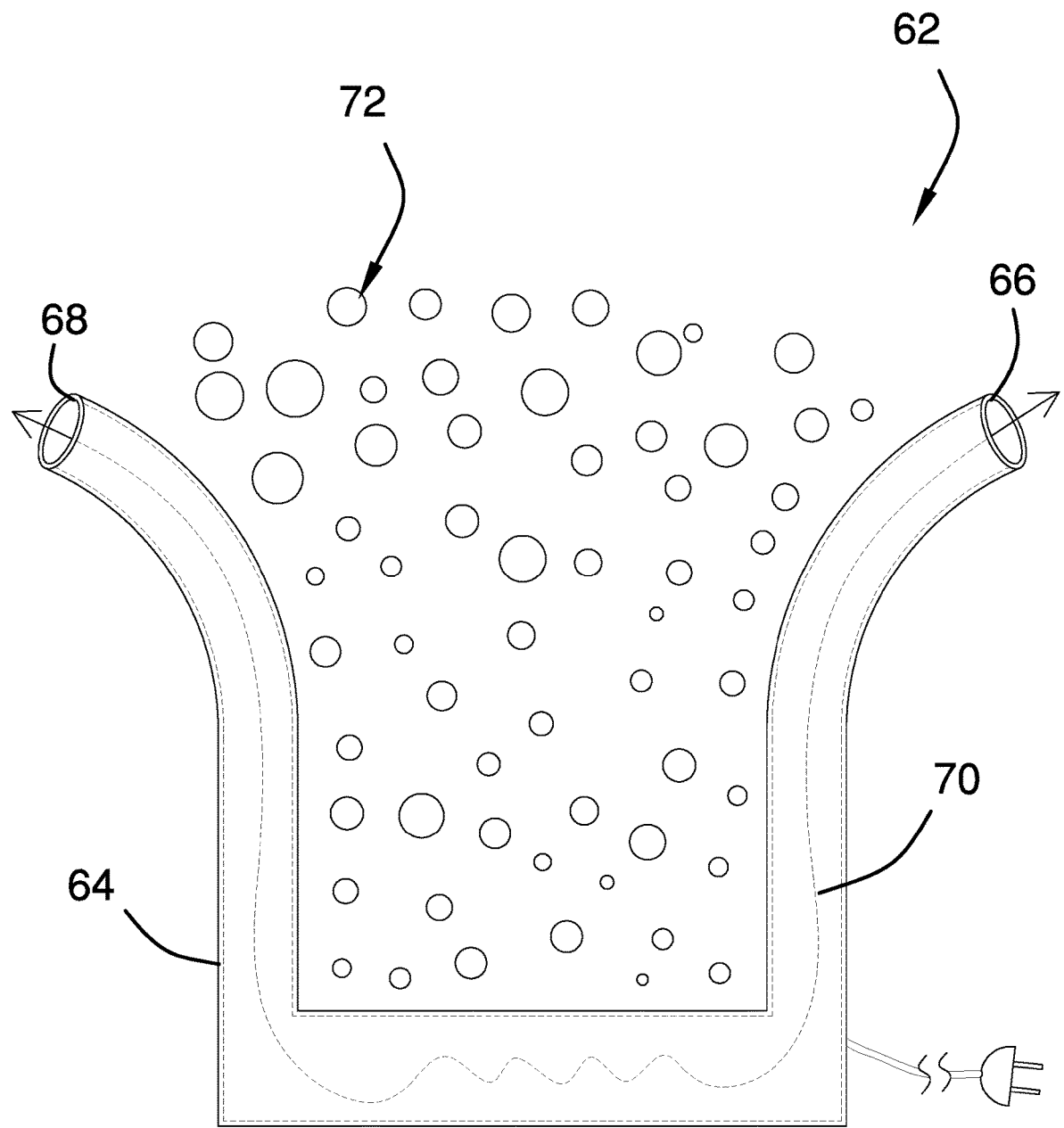
FIG. 7 is a perspective view of an alternative embodiment of the disclosure.

In an alternative embodiment 62 as is most clearly shown in FIG. 7, a fog unit 64 is provided that has an intake 66 and an exhaust 68. The intake 66 is fluidly coupled to a source of refrigerant 70 such that the fog unit 64 is cooled by the refrigerant 70. The fog unit 64 is positionable within the housing 12 such that the fog unit 64 is in fluid communication with the water 16. The fog unit 64 produces a fog 72 when the fog unit 64 is turned on to enhance the ornamental appeal of the housing 12.

In use, water 16 is poured into the housing 12 and the power cord 41 is plugged into the power source to turn on the misting unit 26. The misting unit 26 produces the mist 27 and the mist 27 is urged outwardly through each of the tubes 36. In this way the tubes 36 directs the mist 27 outwardly from the housing 12 for cooling off during a hot day. Additionally, the tubes 36 can be pointed in a chosen direction thereby facilitating the tubes 36 to direct the mist 27 at a plurality of different people.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An outdoor misting assembly being configured to produce a cooling mist for relief of outdoor heat, said assembly comprising:
    a housing having a fluid reservoir therein wherein said housing is configured to be filled with water;
    a misting unit being positioned in said fluid reservoir wherein said misting unit is configured to be submerged in the water, wherein said misting unit is configured to convert, the water into the cooling mist;
    a plurality of tubes, each of said tubes being fluidly coupled to said misting unit wherein each of said tubes is configured to receive the mist, each of said tubes extending outwardly from said housing wherein each of said tubes is configured to direct the mist toward a plurality of users for cooling the users during a hot day;
    wherein said housing has a bottom wall, a top wall and an outer wall extending therebetween, said top wall having an opening extending into an interior of said housing; and
    wherein said misting unit lies on said bottom wall of said housing, said misting unit having a fluid intake and a plurality of mist outlets, said misting unit urging the water inwardly through said fluid intake, said misting unit urging the mist outwardly through each of said mist outlets.

2. The assembly according to claim 1, further comprising a plurality of funnels, each of said funnels being coupled to said misting unit, each of said funnels being in fluid communication with a respective one of said mist outlets wherein each of said funnels is configured to direct the mist outwardly from said misting unit, each of said funnels having a distal end with respect to said misting unit, each of said funnels tapering inwardly between said misting unit and said distal end.

3. The assembly according to claim 2, wherein each of said tubes has a first end and a second end, said second end of each of said tubes being fluidly coupled to said distal end of a respective one of said funnels, each of said tubes extending outwardly through said opening in said top wall of said housing having said first, end of each of said tubes being exposed, each of said tubes being comprised of a resiliently deformable material thereby facilitating said first end of each of said tubes to be pointed in a predetermined direction.

4. The assembly according to claim 1, further comprising a power cord being coupled to and extending outwardly from said housing, said power cord being electrically coupled to said misting unit, said power cord having a distal end with respect to said housing, said distal end of said power plug having a male plug being electrically coupled thereto, said male plug being insertable into power source comprising a solar panel outlet.

5. An outdoor misting assembly being configured to produce a cooling mist for relief of outdoor heat, said assembly comprising:
    a housing having a fluid reservoir therein wherein said housing is configured to be filled with water, said housing having a bottom wall, a top wall and an outer wall extending therebetween, said top wall having an opening extending into an interior of said housing;
    a misting unit being positioned in said fluid reservoir wherein said misting unit is configured to be submerged in the water, wherein said misting unit being configured to convert the water into the cooling mist, said misting unit lying on said bottom wall of said housing, said misting unit having a fluid intake and a plurality of mist outlets, said misting unit urging the water inwardly through said fluid intake, said misting unit urging the mist outwardly through each of said mist outlets;

a plurality of funnels, each of said funnels being coupled to said misting unit, each of said funnels being in fluid communication with a respective one of said mist outlets wherein each of said funnels is configured to direct the mist outwardly from said misting unit, each of said funnels having a distal end with respect to said misting unit, each of said funnels tapering inwardly between said misting unit and said distal end;

a plurality of tubes, each of said tubes being fluidly coupled to said misting unit wherein each of said tubes is configured to receive the mist, each of said tubes extending outwardly from said housing wherein each of said tubes is configured to direct the mist toward a plurality of users for cooling the users during a hot day, each of said tubes having a first end and a second end, said second end of each of said tubes being fluidly coupled to said distal end of a respective one of said funnels, each of said tubes extending outwardly through said opening in said top wall of said housing having said first end of each of said tubes being exposed, each of said tubes being comprised of a resiliently deformable material thereby facilitating said first end of each of said tubes to be pointed in a predetermined direction; and a power cord being electrically coupled to said misting unit, said power cord having a distal end with respect to said housing, said distal end of said power plug having a male plug being electrically coupled thereto, said male plug being insertable into power source comprising a solar panel outlet.

6. The assembly according to claim 5, wherein said housing comprises a plurality of oblate spheroids being stacked on top of one, another, each of said tubes extending outwardly through a respective one of said oblate spheroids.

7. The assembly according to claim 5, wherein said assembly includes a bucket having a lower end and an upper end, said misting unit being positioned within said bucket having said misting unit resting on said lower end.

8. The assembly according to claim 7, further comprising a manifold being fluidly coupled to said misting unit wherein said manifold is configured to receive the mist, each of said tubes being fluidly coupled to and extending upwardly from said manifold having each of said tubes being directed outwardly from said upper end of said bucket.

9. The assembly according to claim 5, further comprising a fog unit having an intake and an exhaust, said intake being fluidly coupled to a source of refrigerant wherein said fog unit is configured to be cooled by the refrigerant, said fog unit being positionable within said housing wherein said fog unit is configured to be in fluid communication with the water, said fog unit producing a fog when said fog unit is turned on wherein said fog unit is configured to enhance the ornamental appeal of said housing.

* * * * *